No. 613,786. Patented Nov. 8, 1898.
G. W. TURNER & A. F. W. LESLIE.
COMPOSITE PRINTING PLATE AND APPARATUS FOR MAKING SAME.
(Application filed Feb. 10, 1897.)
(No Model.) 2 Sheets—Sheet 1.
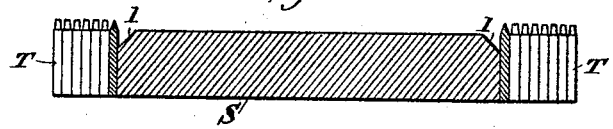
Fig. 1.
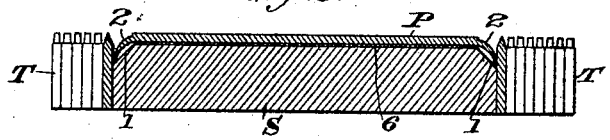
Fig. 2.
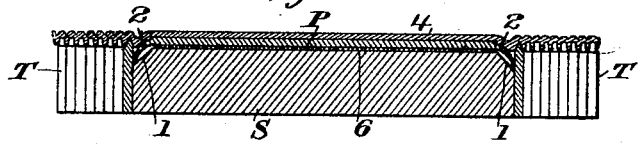
Fig. 3.
Fig. 4.
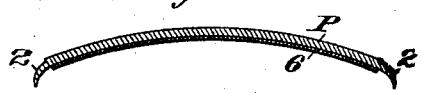
Fig. 5.
Fig. 12.
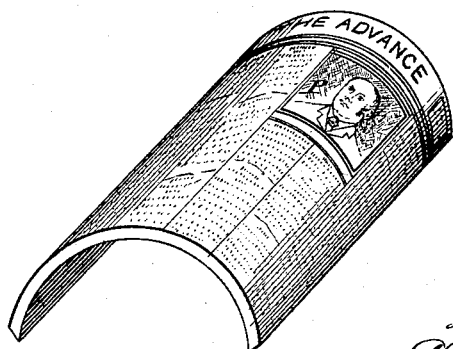
Attest:
S. Vidal
A. F. Bourke
Inventors:
George W. Turner
and
Alexander F. W. Leslie
By Philipp, Munson & Phelps,
Attys No. 613,786. Patented Nov. 8, 1898.
G. W. TURNER & A. F. W. LESLIE.
COMPOSITE PRINTING PLATE AND APPARATUS FOR MAKING SAME.
(Application filed Feb. 10, 1897.)
(No Model.) 2 Sheets—Sheet 2.
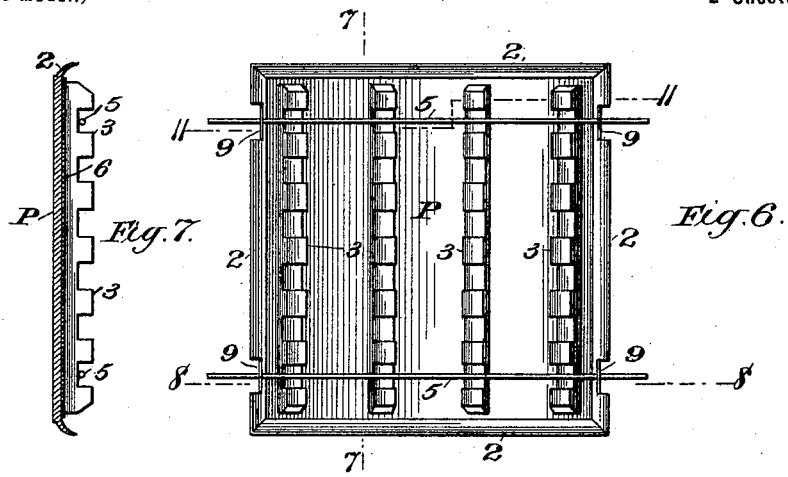
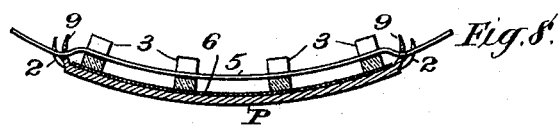
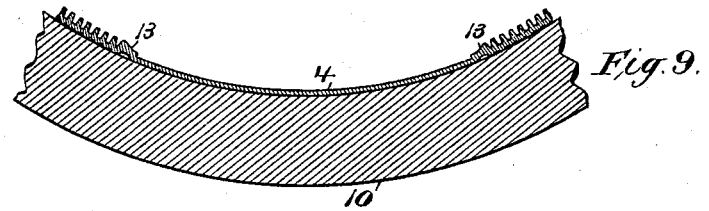
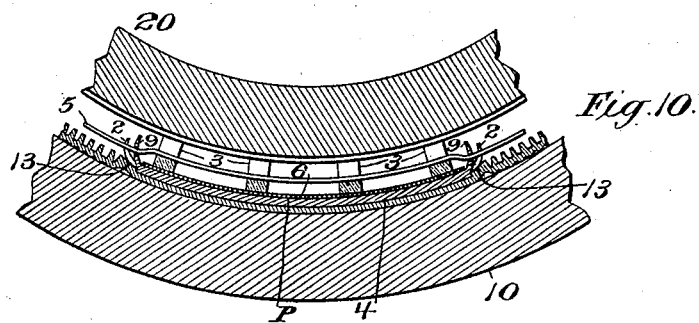
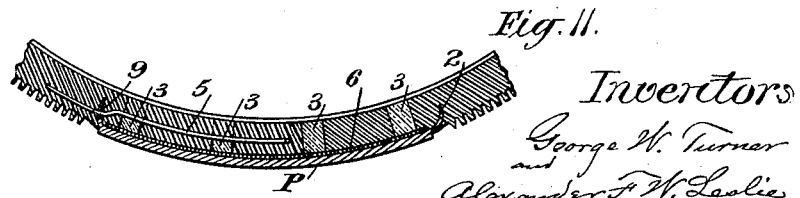
Attest:
S. Winthal
A. V. Bourke
Inventors
George W. Turner
and
Alexander F. W. Leslie
by Phelps Munson & Phelps
Attys

UNITED STATES PATENT OFFICE.

GEORGE W. TURNER AND ALEXANDER F. W. LESLIE, OF NEW YORK, N. Y., ASSIGNORS, BY MESNE ASSIGNMENTS, OF ONE-THIRD TO GROSVENOR H. BACKUS, OF SAME PLACE.

COMPOSITE PRINTING-PLATE AND APPARATUS FOR MAKING SAME.

SPECIFICATION forming part of Letters Patent No. 613,786, dated November 8, 1898.

Application filed February 10, 1897. Serial No. 622,757. (No model.)

*To all whom it may concern:*

Be it known that we, GEORGE W. TURNER and ALEXANDER F. W. LESLIE, citizens of the United States, residing at New York, (Brooklyn,) county of Kings, and State of New York, have invented certain new and useful Improvements in Composite Printing-Plates and Apparatus for Making the Same, fully described and represented in the following specification and the accompanying drawings, forming a part of the same.

The object of this invention is the production of a composite printing-plate whose main body is a casting and whose printing-face is composed in part of an engraved printing-plate, the two being united or anchored together, so as to form a composite whole, by means in whole or in part embodied with the main body thereof during the casting operation producing it.

The invention includes various features of construction in apparatus for producing such composite printing-plates and the plate itself as an article of manufacture, together with certain combinations of its elemental parts and features of its construction, all of which will be hereinafter fully described in this specification and specifically pointed out in the claims.

In the accompanying drawings, illustrative of the preferred embodiment of this invention, Figure 1 represents a sectional elevation of so much of a printing-form as is necessary to show the printing-type and the relation thereto of a metal block inserted within the same for temporarily supporting the engraved plate. Fig. 2 represents a like view of the same, with the engraved plate underlaid and rested upon the supporting-block in position for the making of a stereotype-matrix from the form. Fig. 3 represents the matrix when formed thereon and capable of being removed from the form and used in casting a stereotype-plate. Fig. 4 is a sectional view of the matrix removed from the form. Fig. 5 is a sectional view of the engraved plate underlaid and curved. Fig. 6 represents a plan view of the under side of the engraved plate bent to conform to the arc which the finished composite plate is to have and with the anchor-blocks and wires as applied for casting. Fig. 7 represents a sectional elevation thereof, taken on the section-line 7 of Fig. 6. Fig. 8 represents a similar view of the same, taken on the section-line 8 of Fig. 6. Fig. 9 represents a sectional elevation of the bottom member of a stereotype-casting box, with the matrix resting upon the curved bed thereof. Fig. 10 is a like view of the same parts, with the curved engraved plate and its accessories, as shown in Figs. 6 to 8, in place therein and the cover of the stereotype-casting box closed down thereon, as in making ready for the cast. Fig. 11 represents a sectional elevation of the composite casting or plate, taken on the section-line 11 of Fig. 6. Fig. 12 represents a perspective view, reduced size, of the completed plate.

This invention, though broadly applicable to the production of stereotype printing-plates generally, is especially directed to such printing-plates as are used in the printing of newspapers requiring pictorial illustration and which must be rapidly produced, and more particularly to curved plates such as are used upon the curved beds or form-carrying surfaces of rotating printing-machines.

A detailed description of this invention as carried out with respect to and as embodied in the curved stereotype printing-plate ordinarily used in the production of daily newspapers containing illustrative pictures will so fully disclose the same that its broad application in the making of all printing-plates will be readily understood.

The union of engraved or separate plates having sharply-defined printing-faces with a cast stereotype printing-plate as a component part thereof in order to provide a portion of such cast stereotype-plate with a printing-surface of the finest character, and especially when such cast plate is a curved body adapted to fit upon the curved exterior of a form-carrying cylinder, has long been regarded as a most desirable result, but heretofore has not been satisfactorily accomplished because of the lack of suitable means for uniting the independently-produced original or engraved plate with the stereotype cast in such a manner as to provide that stability which will enable the composite plate to undergo the strain of the printing operation without separation of its parts and in the case of the union of such an original or separate plate with the stereotype-plate during the casting operation by reason of the difficulty of mounting and retaining the then independent engraved plate in position not only vertically in its facial alinement with the face of the impressions of the type in the matrix, but laterally with respect to the other parts of the matrix.

In the preferred mode of producing our improved printing-plate, and realizing the desirable result of combining an original or engraved plate with a printing-plate the remaining portions of which are produced by casting it from a matrix or mold, we secure the two together by means of an anchorage that is united to or embodied in the cast portion during the operation of casting it, whereby the metal is enabled to flow around the anchorage, and thus embrace and hold it permanently.

The preferred method employed by us and by which good practical results are attained is as follows: The "form" is composed of printing-type, masses T of which are arranged or made up into a printing-form, as is usual. Within this mass of printing-type is placed a solid block S of a size substantially equal to that of the engraved plate which is to form a part of the composite stereotype-plate. This block S is a low supporting-block—that is to say, its height is substantially so much less than type-high as the engraved plate P is thick—by which structure it is adapted to support the imposed plate P so that the printing-face of the latter is maintained type-high. This block S has at least two of its sides, preferably all, or, it may be, portions only of two, beveled at the upper outer edges or corners, as at 1, (shown in Fig. 1,) so that it may when the plate is laid thereon unobstructively receive the border edges or flanges 2 of the engraved plate or portions thereof, as lips 9, as is shown in Figs. 6, 8, and 10, and thus enable it to rest on and be supported evenly by said block, although the flanges or lips are bent or otherwise formed so as to project beyond the under or reverse face of the plate for a purpose presently to be described.

In order that the engraved plate P may constitute in the composite cast stereotype printing-plate a perfect printing-surface, the condition of its printing-face is first tested by an impression taken from it while the plate is flat, whereby its imperfections will be indicated. This proof-impression may be taken in any common manner, preferably in a press, and this plate P is then treated as are ordinary printing-plates to compensate for its low parts by being underlaid in the usual manner, with additions to its back of paper or similar underlays 6, which will increase the thickness of its body wherever it is desired to bring its face to a perfect printing position. Thus underlaid or prepared this plate P is rested upon the low supporting-block S, as in Fig. 2, and it then constitutes, with the type, a complete printing-form suitable to have a matrix taken from it. The matrix-sheet 4 is then laid over the whole surface of this form and pressed in the usual manner onto the same with such force as to form in its under surface a counterpart of the face of the whole printing-form, and it is then treated in the usual manner to capacitate it for use in making a cast-metal printing-plate from its facial side. It will be observed from Fig. 3 that in thus pressing the matrix-sheet upon the form it will take considerable depressions where the flanges 2 or parts thereof, as the lips 9, of the engraved plate P oppose it or the beveled edge of the block S is found. These depressions or shoulders, due to the action of the cut-away portion of the block S, are to be carefully distinguished from the slight impression which the edge of the face of the plate itself may make in the matrix, which is of little depth. These shoulders or depressions are of considerable depth, and they act to guide the plate to its position in the matrix and also to support it in said position, as hereinafter set forth. The completed matrix 4 is then removed from the printing-form and deposited upon the curved bottom of the stereotype-casting box, as is shown in Fig. 9, where the part 10 represents a section of the base or bottom of such a casting-box, with which base or bottom a hinged cover 20 (see Fig. 10) coöperates and when closed down thereon completes the mold, in which a curved stereotype-plate, substantially such as is shown in Figs. 11 and 12, may be cast by the use of molten metal, as is well understood in the art.

As the separate or engraved plate must afford a means for its attachment to the stereotype cast and said means must be independent of its printing-face, said plate is provided with the border flanges 2 or lips 9, hereinbefore referred to, and in this preferred method of procedure said flanges are turned down or bent rearwardly—that is, beyond the reverse face of the plate—before the matrix is formed, as seen in Fig. 2, so that they may enter into or rest in the recesses constituted by the beveled edges of the supporting-block, between the same and the type, during the operation of forming the matrix.

When the matrix has been formed, the engraved plate is removed from the form and given in a bending-machine the required curvature conforming with that of the cast portion, as is shown in Figs. 5, 10, and 11, whereby it is adapted for union with said cast portion of a composite plate. In order, however, to provide for the necessary retention and support of the engraved plate P as an integral part of the stereotype or cast portion of the composite plate, said cast portion is provided with an anchor block or blocks 3, which are introduced into the casting-box before the metal is poured and so that the metal flowed around them will so envelop, embrace, or clamp the anchor block or blocks as to constitute them a part of the cast, and thus afford as a part of said casting itself a practical means to which the engraved plate may be secured or anchored and when so combined therewith operate to resist the strains exerted during the printing operation. The result now to be attained is to so securely combine this separate or engraved plate with the stereotype or cast plate that the composite plate may not only be speedily produced for use, but have sufficient stability to successfully endure without injury the severe strains to which it must be subjected in the printing operation. In accomplishing this we preferably unite, bind, or attach projecting parts or border flanges of this plate which extend beyond its printing-face to the anchor block or blocks embraced in the casting and in such manner that a connection between the two will be effected that is adequate to maintain them in their united relation, and thus enable thin, original, or fine plates to become a part of the cast or coarse plate and constitute a composite whole capable of long use without springing apart or separating. Many mechanical means for uniting these parts are available; but one means which we have adopted and herein illustrated and which is preferred, because it conduces to the rapid production of the composite plate, will now be explained in connection with our preferred mode of forming the composite whole. The flanges 2, projecting from two or more of the sides of this engraved plate, are each perforated at two or more points, as shown in Figs. 6 and 8, to receive fastening or binding wires 5, by which the said plate is connected with or joined to the anchor-blocks 3, which are ultimately embraced by the stereotype metal. Instead of bending the entire flanges 2 rearwardly it is expedient, where greater ease and rapidity of manipulation is desired, to divide the flanges 2, so as to form binding-lips 9, which may be perforated for the wires 5 and readily and quickly bent rearwardly far enough to enable these binding-wires to connect with the anchor-blocks at any point or points desired or necessary to afford the connection required. This engraved plate, provided with the perforated flanges 2 or punctured lips 9, is then deposited upon the face of the matrix 4 in the casting-box, being inserted in the depressed part or low seat therein, bounded in whole or in part by the shoulders, (see Fig. 9,) which shoulders act to guide the plate to its place, and thus facilitate its rapid positioning in the matrix. This plate will then rest in its relative position with respect to the multi molds or impressions made by the type in said matrix (see Fig. 10) and be held in its place against lateral displacement in either direction by its edges resting against the shoulders of the depressed part or recess formed by it in the matrix, and it may be partially supported by its flanges 2 resting in part against the shoulders provided by the greatly-depressed parts 13 of the matrix which were forced into the recesses afforded by the beveled edges of the low supporting-block S. This holding of the plate by its side edges bearing against the shoulders of the recess in the matrix is very important in the formation of a curved composite plate, as most situations of the engraved plates in the casting-box are such that gravity would otherwise cause displacement of the plate. The anchor-blocks 3, preferably multifaced, as shown, are then laid upon the back side of the plate P, the same being radially disposed, as shown, and of such a thickness, size, and form as to be securely embodied by the stereotype metal when it hardens about them. They thus not only form a secure anchorage for the engraved plate when the same is united to them, but as they are made of a height to cause them to bear upon the back of said engraved plate and the face of the cover 20 of the casting-box they not only constitute by their pressure thereon a holding-support confining said plate in its place in said casting-box, whereby its printing-face is generally held in alinement with the faces of the type-molds in the matrix which are to form the printing-surface of the type-body, but prevent its lateral displacement by retaining it in said seat, confined by the shoulders thereof. This function of them is important, because in the ordinary manipulation of a stereotype-casting box the same is practically horizontal when the matrix is adjusted therein, remains so while its cover is closed down and locked in position, and is then raised to a nearly vertical position to receive the molten metal, which manipulation, without the anchor block or blocks, would enable this plate to move out of its seat and, losing its exact position, thus destroy the cast. As the combined height of the plate and the anchor block or blocks is equivalent to type-height, the pressure which is imparted to them in the act of locking the closed cover of the casting-box by the usual clamping-screws operates to cause the underlays to press parts of the plate outward, and thus bring up its printing-surface as desired and sustain it until such position is secured by the cast body. The anchor-blocks, as many as may be desired or the size of the plate or its underlays may require, having been placed upon the back of said engraved plate the binding-flanges 2 or wires 5 are passed through the binding-lips 9 on one side of the plate, then through or over the anchor-blocks, then through the binding-flanges 2 or lips 9 on the other side of the plate, thereby connecting or locking the said plate to the anchorage; and in order to bind the parts snugly together these wires are during their insertion preferably bent inwardly far enough to form a spring-like bend, that causes them to primarily bind the parts together by a retaining pressure exerted between the lips and anchor-blocks; but the same effect will be attained by inserting straight wires and then bending the binding-lips 9 far enough to exert the required pressure between said parts. With these accessories it will be observed from Fig. 10 that the engraved printing-plate P is not only rested within the recesses formed by it in the matrix, but is fastened to anchor-blocks by a connection uniting the two; also, that said anchor-blocks project from this plate rearward to an extent equal to the thickness of the cast that is to be made, and thus constitute, when the cover of the casting-box is closed and locked, a holding means securely retaining said plate in its exact relation to the matrix during the movement of the casting-box for the pour; also, that the anchor-blocks coact with the underlays to force them to duty, and, furthermore, that when the metal is poured into the casting-box to form the stereotype-plate it will envelop the anchor-blocks and binding-wires and constitute them an integral part of itself, thus forming a composite printing-plate of which the engraved plate P is a member firmly connected thereto, as is shown in Figs. 11 and 12. These anchor-blocks are preferably made of kiln-dried wood, but other materials, as papier-mâché, sufficiently dry for the casting operation may be made use of.

While the entire holding structure shown is a preferable form, especially where the engraved plate has a considerable superficial area because the means employed provides the great strength required to resist the severe strain tending to separate the engraved plate from the cast portion, it is practicable where the plate is small, and especially if it be a thin one, to omit the binding-wires and depend for its anchorage upon its flanges or sections thereof projecting on two opposite or all of its sides, said projecting parts being bent rearwardly sufficiently to be incorporated in the stereotype-plate during the casting operation, as substantially appears at the right-hand end of Fig. 11. In such cases one or more blocks 3 will be used and may be held by glue or by the nip of the casting-box and perform their functions of maintaining the plate in place against the matrix and causing the underlays to be properly pressed, either or both, as may be desired, and this is therefore subordinately embraced by our invention.

The term "engraved plate" has been used as indicating any original plate formed with such a fine or sharp printing-surface as may not be reproduced in a matrix and which is usually made upon a thin plate that requires to be backed up to give it printing height, the purpose being to supply a cast or stereotype plate with portions of its printing-surface capacitated to print art impressions of the finest character.

By the means and procedure before described a composite printing-plate formed for the most part by a cast stereotype-plate made by a matrix taken from printing-type is provided with thin engraved or fine art-plates of the best character now produced and that the combination of the same with the cast stereotype-plate is accomplished so speedily and with such strength structurally as to enable the same to be used where quick production is necessary or the composite plate is to be used in making a great number of impressions, as in the printing of newspapers, which now issue such large editions.

What is claimed is—

1. As a means for forming composite printing-plates with a separate engraved plate united to a cast stereotype-body as a part of the printing-face, a stereotype-casting box and a matrix therein having a recess, an engraved plate fitting the recess, said recess being provided with deep guiding and supporting shoulders on one or more of its sides for holding the plate against displacement by gravity, substantially as described.

2. As a means for forming composite printing-plates with a separate engraved plate united to a cast stereotype-body as a part of the printing-face, a curved stereotype-casting box, a matrix therein having a recess provided with deep guiding and supporting shoulders on one or more of its sides, said recess being adapted to receive an engraved plate and hold it laterally in position, an engraved plate within and fitting said shouldered recess, and a block or blocks behind said plate whereby said plate is maintained facially in position during the casting operation, substantially as described.

3. As a means for forming composite printing-plates with a separate engraved plate united to a cast stereotype-body as a part of the printing-face, a stereotype-casting box provided with means for closing the same under pressure, a matrix in said box, an engraved plate on said matrix, underlays on the rear face of said plate, and a block or blocks behind said plate whereby said underlays are made effective, substantially as described.

4. As a means for forming composite printing-plates with a separate engraved plate united to a cast stereotype-body as a part of the printing-face, a stereotype-casting box, a matrix therein, an engraved plate, a block or blocks behind said plate, and mechanical connections between said plate and block or blocks for holding the plate and block or blocks together and in proper position for completing the composite plate by the casting operation, substantially as described.

5. As a means for forming composite printing-plates with a separate engraved plate united to a cast stereotype-body as a part of the printing-face, a stereotype-casting box, a matrix therein having a shouldered recess adapted to receive an engraved plate and hold it laterally in position, an engraved plate within said shouldered recess, a block or blocks behind said plate, and mechanical connections between said plate and block or blocks for holding the plate and block or blocks together and in proper position for completing the composite plate by the casting operation, substantially as described.

6. As a means for forming composite printing-plates with a separate engraved plate united to a cast stereotype-body as a part of the printing-face, a stereotype-casting box, a matrix therein, an engraved plate on said matrix, a block or blocks behind said matrix, and means for securing said block or blocks in proper relation to the plate consisting of holding-flanges or lips projecting from said plate, and retaining connections between the flanges or lips and the block or blocks, substantially as described.

7. An apparatus for forming composite printing-plates, consisting of a casting-box, matrix 4 in said box having a shouldered recess, printing-plate P in said recess having rearwardly-projecting perforated flanges or lips, multifaced anchor-blocks 3, and a wire or wires 5 passing through the flanges or lips and across the blocks, substantially as described.

8. A matrix-form having type portions and low block S adapted to receive an engraved plate and having one or more of its top edges cut away to form depressions for the matrix between the top surface of the plate and the type, substantially as described.

9. A matrix-form having type portions, low block S having two or more of its top edges cut away to form depressions between the top surface of the plate and the type, and an engraved plate on said block having edge flanges or lips bent rearwardly into said depressions, substantially as described.

10. A matrix-form having type portions, low block S having two or more of its top edges cut away to form depressions between the top surface of the plate and the type, an engraved plate on said block having edge flanges or lips bent rearwardly into said depressions, and underlays between the plate and the block, substantially as described.

11. A matrix for casting a composite printing-plate having a recess corresponding in size to the engraved plate which it is adapted to receive and separated from the type-casting portions of the matrix by deep guiding and supporting shoulders sufficiently large to guide the plate to position and support it therein, substantially as described.

12. A matrix for casting a composite printing-plate having a recess between the type-casting portions provided with deep guiding and supporting shoulders adapted to guide the plate to position and support it therein, an engraved plate in and fitting said recess, a block or blocks behind said plate, and connections between said plate and block or blocks, substantially as described.

13. A matrix for casting a composite printing-plate having a recess, an engraved plate in said recess, a block or blocks behind said plate, holding flanges or lips projecting rearwardly from said plate, and retaining-wires connecting the flanges or lips and the block or blocks, substantially as described.

14. A composite printing-plate consisting of a cast stereotype-body with which an engraved plate provided with suitable underlays is incorporated as a portion of its printing-surface and secured in place by the cast metal, the underlay being between the plate and the cast metal substantially as described.

15. A composite printing-plate consisting of a cast stereotype-body with which an engraved plate is united by portions of the plate secured by mechanical connections to an anchor block or blocks and incorporated with the anchor block or blocks in the cast metal of the stereotype-plate, substantially as described.

16. A composite printing-plate consisting of a cast stereotype-body, an engraved plate having perforated flanges or lips, an anchor block or blocks, and wires extending through said perforated flanges or lips and securing the engraved plate to the anchor block or blocks, said flanges or lips and the anchor block or blocks and wires being incorporated in the cast metal of the stereotype-plate, substantially as described.

In testimony whereof we have hereunto set our hands in the presence of two subscribing witnesses.

G. W. TURNER.
ALEX. F. W. LESLIE.

Witnesses:
H. T. MUNSON,
A. L. KENT.